(12) United States Patent
Nitta et al.

(10) Patent No.: US 8,298,630 B2
(45) Date of Patent: Oct. 30, 2012

(54) POLYCARBONATE RESIN FILM AND MANUFACTURING PROCESS THEREOF

(75) Inventors: Hideaki Nitta, Chiyoda-ku (JP);
Masahiro Murakami, Chiyoda-ku (JP);
Kunio Hatanaka, Chiyoda-ku (JP);
Takatsune Yanagida, Chiyoda-ku (JP);
Hironobu Katoh, Chiyoda-ku (JP);
Kinji Hasegawa, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 291 days.

(21) Appl. No.: 12/227,982

(22) PCT Filed: Dec. 27, 2006

(86) PCT No.: PCT/JP2006/326385
§ 371 (c)(1),
(2), (4) Date: Dec. 4, 2008

(87) PCT Pub. No.: WO2007/141899
PCT Pub. Date: Dec. 13, 2007

(65) Prior Publication Data
US 2009/0186168 A1    Jul. 23, 2009

(30) Foreign Application Priority Data
Jun. 5, 2006  (JP) .................. 2006-156143

(51) Int. Cl.
*B32B 27/00*   (2006.01)
*B29C 47/88*   (2006.01)
(52) U.S. Cl. ............... 428/1.1; 428/156; 264/211.12
(58) Field of Classification Search ............... 428/1.1, 428/156; 264/211.12
See application file for complete search history.

(56) References Cited

U.S. PATENT DOCUMENTS

| | | | |
|---|---|---|---|
| 5,147,592 A | 9/1992 | Sato et al. | |
| 5,846,626 A | 12/1998 | Kashiwagi et al. | |
| 6,537,636 B1 | 3/2003 | Wisnudel et al. | |
| 6,913,714 B2 | 7/2005 | Liu et al. | |
| 6,986,861 B2 | 1/2006 | Yamasaki et al. | |
| 2003/0215582 A1 | 11/2003 | Bermel | |
| 2004/0027703 A1* | 2/2004 | Yamasaki et al. | 359/883 |

(Continued)

FOREIGN PATENT DOCUMENTS
CN    1502460    6/2004
(Continued)

OTHER PUBLICATIONS

Machine_English_Translation_of_JP_2001243659_A, Hosoi, Plastic Film Roll and Method of Manufacturing Optical Disk, Sep. 7, 2001, JPO, pp. 1-18.*

(Continued)

*Primary Examiner* — David Sample
*Assistant Examiner* — Tahseen N Khan
(74) *Attorney, Agent, or Firm* — Wenderoth, Lind & Ponack, L.L.P.

(57) ABSTRACT

A polycarbonate resin film which has an average thickness of 10 to 150 μm, a thickness nonuniformity of 2% or less, a retardation R(589) in the plane of the film measured at a wavelength of 589 nm of 12 nm or less, a retardation Rth(589) in the thickness direction of the film measured at a wavelength of 589 nm of 35 nm or less and is used for optical purposes.

6 Claims, 1 Drawing Sheet

U.S. PATENT DOCUMENTS

| | | | |
|---|---|---|---|
| 2004/0137269 A1* | 7/2004 | Hay et al. | 428/690 |
| 2005/0228137 A1* | 10/2005 | Srinivasan et al. | 525/186 |
| 2009/0033833 A1 | 2/2009 | Aminaka | |
| 2010/0179263 A1* | 7/2010 | Heki | 524/291 |
| 2011/0212302 A1* | 9/2011 | Nitta et al. | 428/156 |

FOREIGN PATENT DOCUMENTS

| | | |
|---|---|---|
| EP | 0 916 475 | 5/1999 |
| EP | 1 285 742 | 2/2003 |
| EP | 1 422 043 | 5/2004 |
| EP | 1422043 A1 * | 5/2004 |
| JP | 60-214922 | 10/1985 |
| JP | 62-48523 | 3/1987 |
| JP | 4-166319 | 6/1992 |
| JP | 8-62419 | 3/1996 |
| JP | 8-235638 | 9/1996 |
| JP | 10-217313 | 8/1998 |
| JP | 2932731 | 5/1999 |
| JP | 2001-243658 | 9/2001 |
| JP | 2001-243659 | 9/2001 |
| JP | 2001243659 A * | 9/2001 |
| JP | 2002-74749 | 3/2002 |
| JP | 3297450 | 4/2002 |
| JP | 2002-212312 | 7/2002 |
| JP | 2003-94468 | 4/2003 |
| JP | 3417696 | 4/2003 |
| JP | 2003-302522 | 10/2003 |
| JP | 2004-233604 | 8/2004 |
| JP | 2004-315636 | 11/2004 |

OTHER PUBLICATIONS

International Search Report dated Apr. 17, 2007 in the International (PCT) Application PCT/JP2006/326385 of which the present application is the U.S. National Stage.

English translation of PCT Written Opinion dated Jan. 22, 2009 in the International (PCT) Application PCT/JP2006/326385 of which the present application is the U.S. National Stage.

English translation of Office Action dated Jun. 30, 2009 in Japanese Application No. 2005-336915 corresponding to present U.S. Application.

English translation of Chinese Office Action issued Mar. 3, 2011 in corresponding Chinese Application No. 200680054168.4.

Supplementary European Search Report dated Dec. 6, 2010 in corresponding European Application No. 06843754.

European Office Action issued Sep. 28, 2011 in corresponding European Application No. 06 843 754.0.

* cited by examiner

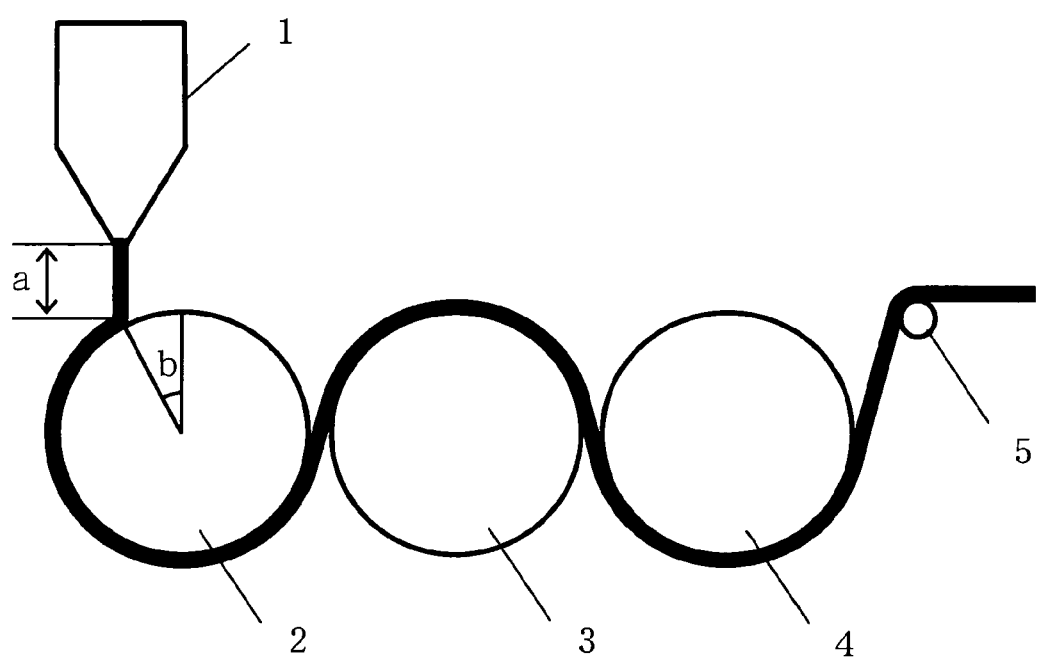

POLYCARBONATE RESIN FILM AND MANUFACTURING PROCESS THEREOF

TECHNICAL FIELD

The present invention relates to a polycarbonate resin film and a manufacturing process thereof. Since the polycarbonate resin film of the present invention has a low retardation in the in-plane direction of the film and also a low retardation in the thickness direction of the film as well as small thickness nonuniformity, it can be advantageously used for optical purposes. The manufacturing process of the present invention is to manufacture the above useful polycarbonate resin film by a melt extrusion method which is excellent in productivity and production cost.

BACKGROUND ART

Remarkable progress has been made in liquid crystal displays and the application of the liquid crystal displays is expanding not only to small- and medium-sized monitors for mobile phones and personal computers but also to large-sized TV screens. A polarizing plate is used in the liquid crystal displays, and a laminated film prepared by sandwiching both sides of a polarizing film obtained by impregnating a polyvinyl alcohol film with iodide or a dichroic pigment and stretching the film between triacetyl cellulose (to be abbreviated as "TAC" hereinafter) films has been commonly used as the polarizing plate.

Although TAC used as a protective film for the polarizing film has advantages such as excellent adhesion to the polarizing film, high transparency and a good appearance, a polarizing plate having a TAC film as a protective film has low durability in a high-temperature high-humidity environment because TAC has high water absorption and water vapor permeability. The TAC film has various disadvantages such as insufficient physical strength with a low tensile strength of about 6 to 11 kg/mm$^2$.

The TAC film is generally manufactured by a solvent cast method. Although the retardation R in the in-plane direction of the film can be made low by the production process in these film forming methods, it is known that the plane orientation of the polymer tends to be high and therefore, it is difficult to make the retardation Rth in the thickness direction low. It is described in the "Development of Low-Retardation TAC Film" of FMC11-2, p. 1317 of the collection of lectures at the 12-th IDW/AD'05 that the high Rth of a TAC film is not desirable for application in IPS (In-Plane-Switching) mode liquid crystal displays.

Films made of various materials have been studied as a protective film for polarizing plates in place of the TAC film. For example, Japanese Patent No. 3297450 reports the use of a thermoplastic saturated norbornene-based resin in place of the TAC film. Although the thermoplastic saturated norbornene-based resin has excellent optical properties, it has low adhesion to a polarizing film. Further, as it has extremely low moisture absorptivity and water vapor permeability, after it is laminated with a polarizing film, water contained in the polarizing film is hardly removed. An unstretched film having low retardations is used as a protective film for polarizing plates. Since the resin has low toughness, its unstretched film has low mechanical strength.

Meanwhile, the use of a polycarbonate resin as a protective film for polarizing plates is now under study. The polycarbonate has appropriate moisture absorptivity and water vapor permeability and its unstretched film has high mechanical strength. For example, JP-A 8-62419 reports a protective film for the polarizing film which is a polycarbonate resin film obtained by the solvent cast method. However, the polycarbonate resin film manufactured by the solvent cast method has a defect which will be described hereinafter.

In the field of optical discs, a polycarbonate resin has been used from a long time ago. Various researches, development and commercialization of optical discs as high-density large-capacity recording media have been made, and various technologies that enable a large volume of data including video information to be recorded on an optical disc have been developed. For instance, a film plane incident type optical disc technology for reading information from one side of an optical disc is proposed in JP-A 08-235638, "Large-volume optical disc having a recording capacity of 12 Gbytes on one side", OplusE, vol. 20, No. 2, p. 183 (February 1998) and "Optical Discs and Peripheral Materials", 98-2 polymer photoelectronics study meeting lecture collection, the Polymer Electronics Study Meeting of the Polymer Association (Jan. 22, 1999). The film plane incident type optical disc is a high-density recording medium which is mainly made from a polycarbonate resin and has a disc-like information recording layer. The information recording layer is formed on the surface of a disc having a thickness of about 0.6 to 1.1 mm. To protect this information recording layer, a film having a thickness of about 0.01 to 0.1 mm is adhered (bonded) to the information recording layer by an adhesive or the like. This protective layer is called "light transmitting layer" among people of ordinary skill in the art.

As the requirements for the light transmitting layer, it must have high transparency, uniform thickness, a low in-plane retardation and a low retardation in the thickness direction and almost the same mechanical properties, especial thermal shrinkage factor as that of a polycarbonate as the main material of an optical disc substrate.

As means of manufacturing a polycarbonate resin film, there have been known a solvent cast method and a melt extrusion method. Out of these, the solvent cast method has been mainly studied for the optical application of the polycarbonate resin film.

For example, the above JP-A 8-62419 relates to a protective film for polarizing films which is a polycarbonate resin film manufactured by a solvent cast method or solvent cast method.

JP-A 2002-074749 discloses that a resin sheet manufactured by a melt extrusion method (substantially the solvent cast method) is used as a light transmitting layer for optical discs and a polycarbonate may be used as one type of the resin. JP-A 2001-243658 and JP-A 2001-243659 disclose a process of manufacturing a light transmitting layer from a polycarbonate by the solvent cast method. Further, a polycarbonate resin film manufactured by the solvent cast method is used in the currently available "Blu-ray Disc" (trade name).

However, the solvent cast method has a cost problem and also a problem that when a thick film is to be manufactured by the solvent cast method, a transparent flexible film is hardly obtained as crystallization occurs in the step of removing the solvent after the solution is applied. The latter problem is an obstacle to the further increase of the density of an optical disc. That is, in a high-density optical disc having two information recording layers, two light transmitting layers having a thickness of about 50 μm and a thickness of about 100 μm are used. The light transmitting layer having a thickness of about 50 μm is positioned in the inside of the optical disc and the light transmitting layer having a thickness of about 100 μm is positioned on the surface layer of the optical disc. The polycarbonate resin film having a thickness of about 100 μm is hardly manufactured by the solvent cast method.

When a film is to be manufactured from a methylene chloride solution of a polycarbonate of the same type as that used as the main material of an optical disc substrate, that is, a bisphenol A-polycarbonate having a relatively low molecular weight of about 15,000 in terms of viscosity average molecular weight and the thickness of the film is about 50 μm or more, the crystallization of the polycarbonate readily occurs in the step of evaporating the solvent, thereby making it extremely difficult to obtain a transparent film. Therefore, to manufacture a light transmitting layer film for optical discs by the solvent cast method, a polycarbonate resin having a high molecular weight (viscosity average molecular weight of about 35,000 to 40,000) which hardly crystallizes is used. However, as an optical disc substrate obtained by injection molding a polycarbonate resin having a low molecular weight and a high-molecular weight polycarbonate resin film manufactured by the solvent cast method differ from each other in physical properties, a disc obtained by laminating them together has a problem with quality, especially long-term stability.

Further, a polycarbonate resin film obtained by the solvent cast method has highly in-plane orientation which is a property not suitable for use as a protective film for polarizing films or light transmitting layer for optical discs.

Then, attempts are being made to manufacture a polycarbonate resin film for optical use by the melt extrusion method. For example, Japanese Patent No. 2932731 (JP-A 4-275129) discloses that a polycarbonate resin film having reduced birefringence at a thickness of 0.2 to 2.0 mm can be manufactured under melt extrusion film forming conditions: (i) a resin temperature of 300 to 330° C., (ii) an air gap of 80 to 100 mm and (iii) a chill roll temperature of 100 to 140° C. Japanese Patent No. 3417696 (JP-A 8-171001) discloses that both end portions of a film are closely contacted and/or pressure contacted to a cooling drum as a process of manufacturing a polycarbonate resin film for use as an electrode substrate for liquid crystal display panels. However, these melt extrusion film forming methods have a defect that the thickness of the formed film changes like undulation and inconvenience that fine streaks are gradually formed on the surface of the film when film formation is continued for a long time.

Meanwhile, JP-A 60-214922 discloses a process of manufacturing an optically non-rotatory thermoplastic resin film by extrusion molding an amorphous thermoplastic resin while applying static electricity to the film to closely contact and fix it on a chill roll. The above publication also discloses that when this technology is carried out, an electrostatic wire is used as an electrode. JP-A 4-166319 proposes a method of manufacturing a sheet having a thickness of about 0.1 to 3 mm and a birefringence in the film width direction of 40 nm or less by melt extruding a polycarbonate resin having a viscosity average molecular weight of 14,000 to 19,000. Further, JP-A 10-217313 discloses a method of manufacturing a polycarbonate resin sheet for optical use which is made of a polycarbonate resin having a viscosity average molecular weight of 14,000 to 19,000 and has a birefringence of 20 nm or less, a curl of 0.5% or less and a thickness of 0.1 to 1 mm. However, the polycarbonate resin films manufactured by these technologies have a defect that the birefringence of the both end portions in the width direction of the film is larger than that of the center portion. Therefore, it is impossible to stably manufacture a film having such a low birefringence uniformly in the width direction that enables it to be used as a polarizing plate protective film for liquid crystal display devices and a light transmitting layer for optical discs.

Further, JP-A 2003-302522 discloses a method of reducing the retardation to 10 nm or less by heating a polycarbonate resin film while tension is applied in the processing direction of the film after the film is manufactured by the melt extrusion method. Since this method requires a heat treatment after film formation, it is inferior in productivity disadvantageously. According to this method, the in-plane retardation can be made low but the retardation in the thickness direction of the film tends to become high. JP-A 2004-315636 discloses a polycarbonate-based resin film which has a birefringence in the plane of the film of $8\times10^{-5}$ to $30\times10^{-5}$ and an optical axis in the width direction of the film. However, the in-plane retardation R actually reported in Examples is not sufficiently low.

As described above, in the conventionally known processes of manufacturing a polycarbonate resin film, a film having a low in-plane retardation and a low retardation in the thickness direction as well as small thickness nonuniformity is not obtained yet, and this film and a technology for manufacturing this film by the industrially advantageous melt extrusion method are desired in the field of optical films, especially protective film for the polarizing films for liquid crystal display devices and light transmitting layers for optical discs.

DISCLOSURE OF THE INVENTION

It is an object of the present invention which has been made in view of the above situation to provide a polycarbonate resin film which has a low retardation in the in-plane direction of the film and also a low retardation in the thickness direction of the film as well as small thickness nonuniformity and a process of manufacturing this useful polycarbonate resin film by a melt extrusion method which is excellent in productivity and production cost.

According to the present invention, firstly, the above object of the present invention is attained by a polycarbonate resin film which has an average thickness of 10 to 150 μm, a proportion of the difference between the largest value and smallest value of thickness to the average thickness of 2% or less, a retardation R(589) in the plane of the film measured at a wavelength of 589 nm of 12 nm or less, a retardation Rth(589) in the thickness direction of the film measured at a wavelength of 589 nm of 35 nm or less and which is used for optical purposes.

Secondly, the above object of the present invention is attained by a process of manufacturing the above polycarbonate resin film by cooling a molten polycarbonate resin extruded into a film form from a die while it is circumscribed around a first chill roll, a second chill roll and a third chill roll sequentially and taking off the film, wherein the air gap between the die and the first chill roll is 5 to 70 mm; the circumferential velocity $R_1$ of the first chill roll, the circumferential velocity $R_2$ of the second chill roll and the circumferential velocity $R_3$ of the third chill roll satisfy $R_2/R_1=1.002$ to $1.050$ and $R_3/R_2=1.000$ to $1.010$; the temperatures of the three chill rolls are in the range of Tg to (Tg−15°) (Tg is the glass transition temperature of the polycarbonate resin in use); and the film is taken off with a tension corresponding to a load applied to the film of 0.5 to 3.0 $N/mm^2$ after it is separated from the third chill roll.

BRIEF DESCRIPTION OF THE DRAWING

FIG. 1 is a schematic diagram of an example of a production apparatus suitable for carrying out the process of manufacturing the polycarbonate resin film of the present invention.

EXPLANATION OF SYMBOLS

1: T-die
2: first chill roll
3: second chill roll
4: third chill roll
5: take-off roll
a: air gap
b: angle formed by a straight line connecting the dropping point of a molten resin and the center of the first chill roll and a plumb line

BEST MODE FOR CARRYING OUT THE INVENTION

The polycarbonate resin used in the present invention is a polymer in which dihydroxy compounds are bonded together by a carbonic ester bond and generally obtained by reacting a dihydroxy compound with a carbonate precursor by interfacial polymerization or melt polymerization.

Typical examples of the dihydroxy compound include 2,2-bis(4-hydroxyphenyl)propane (commonly called "bisphenol A"), 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)cyclohexane, 1,1-bis(4-hydroxyphenyl)-3,3,5-trimethylcyclohexane, 1,1-bis(4-hydroxyphenyl)octane, 1,1-bis(4-hydroxyphenyl)decane, 9,9-bis{(4-hydroxy-3-methyl)phenyl}fluorene, 9,9-bis(4-hydroxyphenyl)fluorene, $\alpha,\alpha'$-bis(4-hydroxyphenyl)-m-diisopropylbenzene, isosorbide, 1,3-propanediol, 1,4-butanediol and 1,6-hexanediol. The polycarbonate resin used in the present invention may be a homopolymer of one of these or a copolymer of two or more.

Out of the above dihydroxy compounds, bisphenol A is preferably used from the viewpoints of cost and the physical properties of the obtained polycarbonate resin. The polycarbonate resin used in the present invention contains bisphenol A in an amount of preferably 50 mol % or more, more preferably 60 mol % or more, much more preferably 75 mol % or more, particularly preferably 90 mol % or more of the dihydroxy compound in use.

The polycarbonate resin used in the present invention may be a linear polycarbonate resin obtained only from the above dihydroxy compound, a polycarbonate resin having a branched structure obtained from a dihydroxy compound and a polyhydroxy compound having 3 or more hydroxyl groups, or a polyester carbonate resin obtained from an aromatic bifunctional carboxylic acid or an aliphatic bifunctional carboxylic acid. It may be a mixture of two or more of the obtained polycarbonate resins.

Examples of the polycarbonate resin preferably used in the present invention include a homopolymer of bisphenol A, a copolymer of bisphenol A and 1,1-bis(4-hydroxyphenyl)-3,3,5-trimethylcyclohexane, and a copolymer of bisphenol A and 9,9-bis{(4-hydroxy-3-methyl)phenyl}fluorene.

As the above carbonate precursor is used a carbonyl halide, carbonate ester or haloformate, as exemplified by phosgene, diphenyl carbonate and dihaloformate of a diphenol.

To manufacture the polycarbonate resin by reacting the above dihydroxy compound with the carbonate precursor by interfacial polymerization or melt polymerization, a catalyst, a terminal capping agent and an antioxidant for the dihydroxy compound may be used as required.

The molecular weight of the polycarbonate resin used in the present invention is preferably 10,000 to 30,000 in terms of viscosity average molecular weight. When the viscosity average molecular weight is lower than 10,000, the obtained film becomes brittle and has no self-supportability, and film formation may become difficult disadvantageously. When the viscosity average molecular weight is higher than 30,000, the polymer is readily oriented at the time of film formation due to high melt viscosity, whereby birefringence is apt to occur in the film, or a gel or a die streak is apt to be formed disadvantageously. The viscosity average molecular weight of the polycarbonate resin is more preferably 12,000 to 19,000, much more preferably 14,000 to 18,000. When the polycarbonate resin in use is a mixture of two or more polycarbonate resins, the above molecular weight is the molecular weight of the whole mixture.

The viscosity average molecular weight as used herein is calculated from the following equation by measuring the specific viscosity ($\eta_{sp}$) of a solution containing 0.7 g of the polycarbonate resin dissolved in 100 ml of methylene chloride at 20° C.

$$\eta_{sp}/c = [\eta] + 0.45 \times [\eta]^2 c$$

$$[\eta] = 1.23 \times 10^{-4} M^{0.83}$$

($[\eta]$ is an intrinsic viscosity, and "c" is a concentration (0.7 g/dL)).

The glass transition temperature of the polycarbonate resin used in the present invention is preferably 100 to 200° C., more preferably 120 to 180° C. When the glass transition temperature is too high, the melt viscosity of the resin becomes too high, thereby making melt film formation difficult disadvantageously. When the glass transition temperature is too low, the heat resistance of the obtained film may become unsatisfactory, which is not preferred when it is used as a protective film for polarizing films.

The polycarbonate resin preferably used in the present invention may contain additives such as a heat stabilizer, antioxidant, ultraviolet absorber, toning agent and antistatic agent in limits that the effect of the present invention is not impaired.

The polycarbonate resin film of the present invention is made of the above polycarbonate resin.

The average thickness of the polycarbonate resin film of the present invention is 10 to 150 μm. The preferred average thickness of the film differs according to application purpose. When the film is used as a protective film for polarizing films, its thickness is preferably 30 to 90 μm and when the film is used as a light transmitting layer for optical discs, its thickness is preferably 20 to 100 μm.

The polycarbonate resin film of the present invention has an extremely small thickness nonuniformity of 2% or less over the entire surface of the film. That is, the proportion of the difference between the largest value and the smallest value of thickness to the average thickness is 2% or less. This thickness nonuniformity is preferably 1.4% or less, more preferably 1.2% or less, much more preferably 1.0% or less. As the thickness nonuniformity becomes lower, variations in the retardation can be made lower and the film is preferred as an optical film. The expression "entire surface" means all the area to be used. An area not suitable for use is existent in the end portions (both end portions in the width direction) of the film formed by the melt extrusion method and is generally cut off before use. The expression "entire surface" does not include the above portions. As will be described hereinafter, the polycarbonate resin film of the present invention is preferably manufactured as a roll having a width of about 600 to 2,000 mm and a length of about 10 to 4,000 m. All the above range can be the above "area to be used". One of the features of the polycarbonate resin film of the present invention is that the film shows the above uniformity in this wide area. As a matter of course, the above uniformity is applied to an area corresponding to a specific object in which the film is to be used, for example, a protective film for polarizing films or a light transmitting layer for optical discs, in the smaller area in the final stage of use. The "entire surface" in the uniformity in the in-plane retardation and the retardation in the thickness direction should be understood as the same as above.

The polycarbonate resin film of the present invention has an in-plane retardation R(589) measured at a wavelength of 589 nm of 12 nm or less. The in-plane retardation (R) is a value defined by the following equation (1) and a characteristic value representing a lag of the phase of light passing in a direction perpendicular to the plane of the film.

$$R=(n_x-n_y) \times d \quad (1)$$

(wherein $n_x$ is the refractive index of a slow axis (direction having the highest refractive index) in the plane of the film, $n_y$ is a refractive index in a direction perpendicular to the slow axis in the plane of the film, and "d" is the average thickness of the film.)

In this text, the in-plane retardation measured at a wavelength of 589 nm is represented by R(589). R(589) is preferably 10 nm or less, more preferably 8 nm or less.

The retardation Rth(589) in the thickness direction of the film is 35 nm or less. The retardation (Rth) in the thickness direction is a value defined by the following equation (2).

$$Rth=\{(n_x+n_y)/2-n_z\} \times d \quad (2)$$

(wherein $n_x$, $n_y$ and "d" are as defined in the above equation (1), and $n_z$ is a refractive index in a direction perpendicular to the plane of the film.)

In this text, the retardation in the thickness direction measured at a wavelength of 589 nm is represented by Rth(589). Rth(589) is preferably 30 nm or less, more preferably 25 nm or less.

The above in-plane retardation R(589) and the retardation Rth(589) in the thickness direction are values over the entire surface of the film. For instance, that R(589) is 12 nm or less means that R(589) is 12 nm or less over the entire surface of the film.

Since the polycarbonate resin film of the present invention has a low in-plane retardation and a low retardation in the thickness direction over the entire surface of the film, when the film is used as a protective film for polarizing films, the 2-D and 3-D leakage of light can be prevented and when it is used as a light transmitting layer for optical discs, the retardations are small for obliquely incident light, thereby obtaining stable signal characteristics.

One of the features of the polycarbonate resin film of the present invention is that variations in the in-plane retardation and the retardation in the thickness direction are low over the entire surface of the film. That is, variations in the in-plane retardation R (589) are preferably ±2.0 nm or less, more preferably ±1.8 nm or less, much more preferably ±1.6 nm or less from the average value. Variations in the retardation Rth(589) in the thickness direction are preferably ±3.5 nm or less, more preferably ±3.0 nm or less, much more preferably ±2.5 nm or less from the average value.

Due to small variations in the retardation in the plane of the film and the retardation in the thickness direction, display nonuniformity can be made low when the film is used as a protective film for polarizing films and fluctuations in signal characteristics can be made small when it is used as a light transmitting layer for optical discs.

The polycarbonate resin film of the present invention preferably has few foreign substances and defects over the entire surface of the film. Stated more specifically, the number of foreign substances and defects having a maximum length of 100 μm or more is preferably 5 or less per $m^2$, more preferably 2 or less per $m^2$. The number of foreign substances can be reduced by suppressing the discoloration or gelation of the resin as much as possible or by using a suitable filter in the manufacture of the film. The number of defects can be reduced by reducing the number of scratches on the surface of a roll, the number of foreign substances adhered to the roll or the number of foreign substances derived from a protective film. When a film having few foreign substances and defects is used as a protective film for polarizing films, it has an advantage that it improves display quality and when it is used as a light transmitting layer for optical discs, the probability of the generation of noise can be reduced advantageously.

When the polycarbonate resin film of the present invention is used as a light transmitting layer for optical discs, the thermal dimensional change rate (thermal shrinkage factor) of the film after it is heated at 100° C. for 24 hours is preferably 0.05 to 0.8%, more preferably 0.2 to 0.6%. The thermal dimensional change rate (thermal shrinkage factor) of the film after it is heated at 140° C. for 1 hour is preferably 0.02 to 0.3%, more preferably 0.03 to 0.25%. When the thermal dimensional change rate of the film falls within this range, the thermal dimensional change rate of the film and the thermal dimensional change rate of the information recording layer of an optical disc manufactured by injection molding are well balanced, whereby an optical disc manufactured by laminating the information recording layer with the polycarbonate resin film of the present invention is improved in durability and long-term stability. Particularly when the optical disc is exposed to a high temperature, its warp deformation becomes significantly small. In general, a polycarbonate resin film formed by a solvent cast method has a thermal dimensional change rate of less than 0.02% after it is heated at 140° C. for 1 hour. When this film is used as a light transmitting layer for optical discs, the above advantageous effect is not obtained.

The polycarbonate resin film of the present invention has a totally light transmittance of preferably 88% or more, more preferably 89% or more. The haze of the film is preferably 1% or less, more preferably 0.5% or less.

A description is subsequently given of the process of manufacturing the polycarbonate resin of the present invention which has the above characteristic properties.

The polycarbonate resin film of the present invention is preferably manufactured by a melt extrusion method in which a molten polycarbonate resin film extruded from a die is cooled while it is circumscribed around a first chill roll, a second chill roll and a third chill roll sequentially and taken off.

Preferably, the extruder used for the above melt extrusion has a hopper unit for supplying a resin, a cylinder unit for melting the resin, a screw for pressing the resin into the cylinder and moving the molten resin, a filter for removing foreign matter contained in the molten resin and a die for extruding the molten resin.

Prior to the melt extrusion, the polycarbonate resin is preferably fully dried to remove water and air contained therein. By drying the resin in advance, the foaming of the obtained film and the heat deterioration of the resin can be prevented advantageously. A preferable drying method is as follows. After raw material resin chips are dried at (Tg−35° C.) to (Tg−20° C.) (Tg is the glass transition temperature of the resin) (specifically, about 110 to 125° C. when the polycarbonate resin in use is a homopolymer of bisphenol A) for 3 hours or longer, they are injected into the hopper of the extruder which is heated at about 80 to 115° C. from the outside to keep them at that temperature. Water contained in the raw material chips and water adhered to the surface of the raw material chips can be removed by this treatment, thereby making it possible to prevent the foaming of the film and the deterioration of the polycarbonate resin by a chemical reaction such as hydrolysis at the same time. To prevent the promotion of the thermal deterioration of the resin by air (oxygen) in the hopper, preferably, the atmosphere in the hopper is substituted by a hot nitrogen gas, or the hot nitrogen gas is circulated.

The polycarbonate resin injected into the hopper is pressed into the extruder by the biting portion (supply portion) of the screw at a feed port. At this point, the resin becomes sticky between the biting start portion of the screw and the barrel portion to be entangled with the screw, whereby the supply of the resin after that is impeded and the resin stays at the same position in the extruder for a long time, thereby gradually producing a brown or black thermally deteriorated product or causing a change in delivery. To eliminate such inconvenience, it is preferred that the barrel portion near the biting portion of the screw should be cooled with water.

The polycarbonate resin is then moved toward the die in the extruder by the movement of the screw of the extruder. At this point, it is preferred that the thermally deteriorated product of the resin should not be produced as much as possible in a flange portion for connecting the end of the extruder and a filter housing, a molten resin conducting pipe, a conducting pipe for connecting the filter housing and the extrusion die, the filter housing portion and the like. To this end, it is preferred that the conducting pipe has a structure that it does not curve sharply in order to prevent the local residence of the resin.

The temperatures of the cylinder and die of the extruder are preferably set to ensure that the melt viscosity of the polycarbonate resin measured at a shear rate of 100 (1/s) at these temperatures is 50 to 600 Pa·s, preferably 70 to 300 Pa·s. By setting the temperatures of the cylinder and die of the extruder to this range, the extruded molten polycarbonate resin exhibits suitable flowability and shear stress in the extruder, the die and the die lip can be suppressed to a low level, whereby birefringence, particularly in-plane birefringence can be made small. When film formation is carried out at the above viscosity range, a drift and residence in the cylinder, filter and filter housing hardly occur, thereby suppressing the generation of thermally deteriorated foreign matter such as a gel.

Since the thermal deterioration of the polycarbonate resin cannot be ignored when its residence time at a high temperature is long, it is preferred that the residence time from the resin biting portion of the extruder to the outlet at the end of the die should be shortened as much as possible. For instance, in the case of a polycarbonate obtained from a dihydroxy compound containing bisphenol A as the main component which is particularly preferably used in the present invention and having a viscosity average molecular weight of about 12,000 to 19,000, it is preferred to set the resin extrusion molding temperature to 250 to 320° C. and the residence time to 30 minutes or less. The residence time is more preferably 20 minutes or less, much more preferably 10 minutes or less. When the residence time is too short and the resin is crystallized, un unmolten product may remain in the film to become internal foreign matter. In this case, the residence time is set to preferably 5 minutes or more, more preferably 5 to 10 minutes. This unmolten product passes through a filter element in the extruder in most cases. By setting the melting temperature and the residence time to the above ranges, the unmolten product is not produced and the thermal decomposition of the polycarbonate resin is suppressed, thereby making it possible to obtain a higher-quality film.

The delivery capacity of the extruder is set in consideration of the above preferred residence time. From the industrial point of view, to manufacture a film having a width of about 1,000 mm and a thickness of about 50 µm, an extruder having a maximum delivery capacity of about 130 kg/h is preferably selected. When this extruder is used, a film having a width of 1,100 mm and a thickness of 50 µm can be formed at a rate of about 30 m/min by using a die having a width of 1,200 mm. A screw which is generally used to melt extrude a polycarbonate resin may be used, and a single-axis screw is preferred.

The filter is preferably composed of a leaf disc-like filter element having a required filtering area and a cylindrical housing for holding this. A known filter element may be used but a commercially available metal heat-resistant and pressure-resistant filter element which is an assembly of sintered metal fibers or fine metal fibers is preferably used.

The melt extrusion die used in the present invention may be a known die such as a T-die (coat hanger type die) which supplies a resin from the center portion in the width direction of the die or an I-die which has a structure that the T-die is divided into two at a resin flow-in part and allows a resin to flow in from one end in the width direction of the die. The lip for extruding a resin of the extrusion die is preferably finished to have a sufficiently flat shape.

In the present invention, the opening of the lip (opening of the die) is preferably 5 t to 25 t, more preferably 7 t to 20 t when the thickness of a desired film is represented by t. More specifically, in the case of a film having a thickness of 100 µm, the opening of the lip is preferably 0.5 to 2.5 mm, more preferably 0.7 to 2 mm. By adjusting the opening of the lip to this range, shear stress which the resin to be delivered receives in the die lip is reduced and birefringence, particularly in-plane birefringence can be suppressed. Since the opening of the lip is sufficiently wide as compared with the thickness of the film, there is obtained an advantageous effect that a scratch of the die lip and a die streak formed by contact with an adherent are suppressed. For application in optical films as in the present invention, it is desired to suppress the die streak of the film as much as possible.

For the automatic control of thickness nonuniformity, the opening of the lip is adjusted by mechanically turning the lip bolt of the die, or the thickness of the film is adjusted by attaching heaters to the die lip at fixed intervals and adjusting the temperatures of these independently to make use of temperature variations in the viscosity of the molten resin (temperature lip).

In the process of manufacturing the polycarbonate resin film of the present invention, the molten polycarbonate resin extruded from the die into a film form is cooled while it is circumscribed around the first chill roll, the second chill roll and the third chill roll sequentially.

The air gap at this point, that is, the distance between the end of the die and the dropping point of the molten resin on the first chill roll is preferably 5 to 70 mm. The air gap is more preferably 5 to 50 mm, much more preferably 5 to 30 mm. The inventors of the present invention have found that undulation-like thickness nonuniformity and a fine streak defect (die streak) are produced when the molten resin extruded into a film form from the die lip shrinks or is influenced by the disturbance of surrounding air in the air gap. Particularly in the case of a polycarbonate resin which is preferably used in the present invention and has a viscosity average molecular weight of 12,000 to 19,000, this tendency is marked because the resin has low melt viscosity. They have found it difficult to form a uniform film by the conventionally known melt extrusion method in which the air gap is wide. Then, in the present invention, a manufacturing process in which the air gap is narrowed to reduce the shrinkage or swing in the space of the molten resin as much as possible is preferably employed.

The angle formed by a straight line connecting the dropping point of the molten resin on the first chill roll and the center of the first chill roll and a plumb line is preferably 0 to 600, more preferably 10 to 50°.

It is preferred that suitable space should be formed between the first chill roll and the second chill roll and between the second chill roll and the third chill roll to prevent the application of nipping pressure to the film between the rolls. The spaces between the rolls are preferably 5 t to 100 t when the desired thickness of the film is represented by "t". When the spaces are made almost the same as the thickness of the film, nipping pressure is applied to the film-like molten resin in the cooling step, thereby increasing the plane orientation of the resin and the retardation in the thickness direction of the film disadvantageously.

The temperatures of the first to third chill rolls used in the process of manufacturing the polycarbonate resin film of the present invention are (Tg–15° C.) to Tg, preferably (Tg–10° C.) to (Tg–1° C.) when the glass transition temperature of the polycarbonate resin in use is represented by Tg (° C.). When the temperatures of the chill rolls are lower than the above range, the adhesion to the rolls of the resin film lowers with the result that the inclusion of air is apt to occur and the homogeneity of the film tends to degrade. When the temperatures of the chill rolls are higher than the glass transition temperature, the adhesion to the rolls of the film becomes too high with the result that the film is apt to be scratched or distorted when it is separated from the rolls.

The temperature of the first chill roll is (Tg–15° C.) to Tg, preferably (Tg–8° C.) to (Tg–1° C.). The temperature of the second chill roll is (Tg–15° C.) to Tg and preferably 1 to 5° C. lower than the temperature of the first chill roll. Further, the temperature of the third chill roller is (Tg–15° C.) to Tg and preferably 0 to 5° C. lower than the temperature of the second chill roll.

It is preferred to use first to third chill rolls whose surface temperatures can be uniformly controlled. In order to keep the surface temperatures of the rolls uniform, it is preferred that a cooling medium whose temperature is controlled should flow in the inside of each roll. A chill roll having a mirror surface is preferably used, and a chill roll made of hard chrome or ceramic is preferably used.

It is generally known that the slow axis becomes the width direction due to the occurrence of molecular orientation in the width direction of the film in the manufacture of a film by the melt extrusion method. The same can be said of a polycarbonate resin film (refer to Patent No. JP 3417696). The inventors of the present invention have found that the development of a retardation in a material in which a retardation is easily obtained in the width direction can be controlled by adjusting the circumferential velocity ratios of three chill rolls to specific ranges. That is, in the process of manufacturing the polycarbonate resin film of the present invention, the $R_2/R_1$ ratio of the circumferential velocity $R_2$ of the second chill roll to the circumferential velocity $R_1$ of the first chill roll is 1.002 to 1.050, preferably 1.005 to 1.050, more preferably 1.015 to 1.045. The $R_3/R_2$ ratio of the circumferential velocity $R_3$ of the third chill roll to the circumferential velocity $R_2$ of the second chill roll is 1.000 to 1.010, preferably 1.0005 to 1.003, more preferably 1.001 to 1.0025. When the $R_2/R_1$ ratio and the $R_3/R_2$ ratio are too low, it is difficult to make the in-plane retardation small and when they are too high, the film may wrinkle or stick to the chill rolls, thereby making film formation unstable disadvantageously. In order to control the speed ratios of the chill rolls accurately, the chill rolls are preferably such that their circumferential velocities can be controlled at an accuracy of 0.01%.

In the process of the present invention, the film forming speed is not particularly limited and can be suitably set to ensure that the physical properties of the film are satisfactory. From the viewpoint of productivity, the film forming speed is desirably high. However, when the speed is too high, the adhesion to the rolls of the film lowers due to the inclusion of air in the cast portion, thereby impairing the homogeneity of the film. In the present invention, the film forming speed is preferably 2 to 50 m/min, more preferably 5 to 30 m/min as the circumferential velocity $R_1$ of the first chill roll.

In the process of the present invention, it is also preferred that the film should be brought into close contact with the first chill roll by static electricity. When the film is brought into close contact with the roll by static electricity, the orientation in the width direction of the film becomes strong. However, the uniformity in the thickness of the film and the retardation, particularly uniformity in the width direction of the film improves due to an increase in adhesion to the roll. Therefore, if the in-plane retardation and the retardation in the thickness direction fall within the target ranges, above electrostatic contact is preferably adapted.

As the electrostatic contact, there are known wire pinning for bringing the entire surface of the film into close contact and edge pinning for bringing only both end portions of the film into close contact, and both of these methods may be used. A known SUS metal wire may be used as the wire for electrostatic contact and tightened with a suitable tension above the surface of the film at intervals of preferably 4 to 7 mm. When only the both end portions are brought into close contact by static electricity, a metal wire being covered with an insulating material (such as a resin thin tube) excluding the both end portions which is positioned above the surface of the film may be used, or a needle-like pin for applying voltage to the end portions may be installed.

The position of the metal wire or the like or the applied voltage may be suitably determined while the film forming state is observed. The voltage is preferably about several kV to 10 kV.

In the process of the present invention, the molten resin extruded into a film form from the die is cooled while it is circumscribed around the first chill roll, the second chill roll and the third chill roll sequentially and taken off preferably by a take-off roll. At this point, the film is taken off with a tension corresponding to a load applied to the sectional area of the film of 0.5 to 3.0 N/mm², preferably 1.0 to 2.5 N/mm². When the load applied to the film is lower than 0.5 N/mm², the in-plane retardation may not be fully reduced disadvantageously. By increasing the tension applied to the film, the in-plane retardation tends to become large in the end portions of the film in the width direction of the film and small in the center portion. When the load applied to the film is higher than 3.0 N/mm², the area of a portion where the in-plane retardation is high at the both ends in the width direction of the film is expanded though the retardation in the center portion in the width direction of the film becomes low, and the width of the film which can be used for the target application of the present invention is reduced disadvantageously.

The optimum values of the above air gap, the angle formed by the straight line connecting the dropping point of the molten resin on the first chill roll and the center of the first chill roll and the plumb line and the ratios of the circumferential velocities of the first to third chill rolls can be influenced by various factors such as the melt viscosity of the resin in use, working environment and the setting conditions of the extruder. Therefore, these parameters are preferably finely adjusted to the optimum conditions while the properties of the obtained film are measured.

The process of the present invention will be described in more detail with reference to the figure.

FIG. 1 is a schematic diagram of an example of a production apparatus suitable for carrying out the process of the present invention. Numeral 1 in FIG. 1 denotes a T-die, 2 the first chill roll, 3 the second chill roll, 4 the third chill roll, 5 the take-off roll, "a" the air gap, and "b" the angle formed by the straight line connecting the dropping point of the molten resin on the first chill roll and the center of the first chill roll and the plumb line. The polycarbonate resin film is shown by a black bold line. As described above, although a wire for electrostatic contact may be used optionally in the process of the present invention, this is not shown. FIG. 1 is a schematic diagram for explaining the concept of the apparatus suitable for carrying out the process of the present invention and does not show the accurate size of the apparatus.

The molten resin extruded from the T-die into a film form is received by the first chill roll 2 to be cooled and then by the second roll 3 and the third roll 4 and taken off by the take-off roll 5.

Film formation is started by installing the apparatus such that the apex of the first roll is positioned right below the lip of the T-die (b=0°) and the air gap "a" becomes 5 to 70 mm, and the in-plane retardation R(589), the retardation Rth(589) in the thickness direction, the orientation of molecules and the thickness nonuniformity of the film obtained in the initial stage are measured. When the slow axis is in the width direction of the film and the in-plane retardation R(589) exceeds 12 nm, the in-plane retardation can be reduced by adopting at least one of the following two methods.

The first method is to increase the angle "b" and the air gap "a" by moving all the chill rolls in the downstream direction (right direction in FIG. 1). Thereby, tension is applied in the lengthwise direction (flow direction) of the film, thereby making it possible to reduce the in-plane retardation.

The second method is to increase the $R_2/R_1$ ratio of the circumferential velocity $R_2$ of the second chill roll 3 to the circumferential velocity $R_1$ of the first chill roll 2. Thereby, the film is stretched more between the first chill roll 2 and the second chill roll 3, thereby making it possible to reduce the in-plane retardation.

However, since the above first method involves the expansion of the air gap "a", the thickness nonuniformity of the film, especially thickness nonuniformity in the length direction of the film becomes large. In the second method, the plane orientation of the film increases, thereby expanding the retardation in the thickness direction. Therefore, the optimum conditions for obtaining the resin film of the present invention can be obtained by carrying out a combination of the above two methods while the thickness nonuniformity and the retardation in the thickness direction are well balanced.

The polycarbonate resin film of the present invention is preferably manufactured as a film roll after the film is formed from the viewpoint of productivity. This roll may be further cut to obtain a roll having a smaller width.

The both end portions in the width direction of the melt extruded film have a thickness different from that of the center portion of the film. That is, when edge pinning is not carried out, the both end portions of the film tend to become thick and when edge pinning is carried out, the both end portions of the film tend to become thin. Therefore, before the film is rolled, the both end portions are preferably cut off (edge trimming) to ensure that desired film properties are obtained over the entire width of the roll.

The width of the film roll is preferably large from the viewpoint of productivity, specifically 600 to 2,000 mm, more preferably 800 to 2,000 mm. When edge trimming is carried out, the preferred width of the film should be understood as a value after edge trimming. The winding length (length of the film) may be determined from the viewpoints of handling ease and productivity and not particularly limited but preferably 10 to 4,000 m.

When the film is rolled in such a manner that it comes into direct contact with the film of the next turn over the entire width of the film, such inconvenience as telescoping may occur due to graze between the surfaces of the film. Therefore, it is preferred to wind the film while the surface of the film is protected. To protect the surface of the film, the following methods may be preferably employed.

(1) winding by knurling in which the both end portions having a small width of a wide film are made uneven mechanically or thermally and the film is taken off while graze is prevented by spacing apart the surfaces on the inner sides of these portions of the film.

(2) co-winding (lap winding) in which only the both end portions of the film are lap wound with a narrow film made of another material to protect the surfaces on the inner sides of these portions of the film from graze.

(3) Entire-surface lap winding in which the film of the present invention is lap wound with another polymer film.

(4) Lap winding in which the film of the present invention is lap wound with a protective film having a weak adhesive layer on the surface.

Out of these, the method (4) using the protective film is preferred from the viewpoints of handling ease, productivity and little influence upon the physical properties of the film. As the protective film is used a film formed by processing the surface of a relatively soft film as a matrix to have a weak adhesive surface.

Preferably, the protective film is wound off from its film roll, joined with the polycarbonate resin film of the present invention, weakly nipped between nip rolls in such a manner that the adhesive surface of the protective film is turned toward the surface of the film of the present invention to be laminated with the film of the present invention and rolled. At the time of winding off the protective film, the protective film is wound off with weak force to prevent the deformation of the protective film by a wind-off tension. The laminate consisting of the protective film and the film of the present invention is preferably rolled with a weak rolling tension.

The polycarbonate resin film of the present invention has optical isotropy 3-dimensionally and can be advantageously used for optical purposes in which a film having uniform thickness is required. It is particularly preferred for use as a protective film for the polarizing film for liquid crystal display devices or a light transmitting layer for optical discs.

When the polycarbonate resin film of the present invention is used as a protective film for polarizing films, the film of the present invention is laminated with a polarizing film by an adhesive or a pressure-sensitive adhesive. Since the polarizing film is generally manufactured by impregnating a polyvinyl alcohol film with iodide or a two-color pigment and stretching it, the above adhesive or pressure-sensitive adhesive must be optically isotropic and adhere or stick to both the polycarbonate and the polyvinyl alcohol. As the adhesive or the pressure-sensitive adhesive may be used a coating type adhesive or pressure-sensitive adhesive or a film-like adhesive or pressure-sensitive adhesive. Examples of the coating type adhesive or pressure-sensitive adhesive include polyester-based, acrylic, polyolefin-based and polyamide-based thermosensitive adhesive resins; acrylic, polyester-based, urethane-based, polyether-based and rubber-based pressure-sensitive adhesive resins; saturated polyester resins; and polyurethane resins. Examples of the film-like adhesive or pressure-sensitive adhesive include films formed by blending a curing agent with a polybutadiene polyol or a resin having a functional group such as a functional group-containing acrylic copolymer to form a film and crosslinking the film partially or incompletely; soft polyvinyl chloride films formed by blending 20 wt % or more of a curing agent with polyvinyl chloride; saturated polyester resin films; acrylic copolymer films; films formed from a synthetic rubber such as butyl rubber, urethane rubber, butadiene-based rubber (such as polybutadiene rubber, styrene-butadiene rubber, styrene-butadiene-styrene block copolymer), or styrene-isoprene-styrene rubber; films formed from a polyolefin-based polymer such as low-molecular weight polyethylene, atactic polypropylene or chlorinated polypropylene; and films formed from an ethylene-based copolymer such as ethylene-vinyl acetate copolymer, ethylene-acrylic acid copolymer or ethylene-acrylic ester copolymer.

The thickness of the adhesive or pressure-sensitive adhesive is preferably set to 1 to 50 μm. After the above pressure-sensitive adhesive layer or adhesive layer is formed on the polarizing film or the polycarbonate resin film of the present invention by a known coating method or a transfer method using a release film, the both films are laminated together to be bonded together. At this point, to improve adhesion or pressure-sensitive adhesion, the surface of at least one of the polarizing film and the polycarbonate resin film of the present invention is preferably activated. Examples of the activation treatment of the surface include corona treatment, UV treatment and plasma treatment.

When the polycarbonate resin film of the present invention is used as a protective film for polarizing films, before it is laminated with the polarizing film, the surface of the film is processed to improve its performance according to its requirements. Examples of the surface treatment include antiglare treatment, nonglare treatment or antireflection treatment for preventing surface reflection to improve the visibility of a liquid crystal panel; antistatic treatment or antifouling treatment for reducing the adhesion of a stain on the surface; hard coating for improving mechanical properties to increase surface hardness and improving solvent resistance and chemical resistance; and coloration for providing a desired color. These treatments can be made by known methods according to purpose. Several surface treatments may be made one upon another.

A triacetyl cellulose (TAC) film which is generally used as a protective film for polarizing films has low heat resistance, is unsatisfactory in terms of mechanical properties and inferior in dimensional stability with a large moisture absorption expansion coefficient, and has low solvent resistance. Treatment conditions for providing functions required for the protective film for polarizing films cannot be set and functions cannot be completely provided. Since the polycarbonate resin film of the present invention has very high levels of heat resistance, mechanical properties and dimensional stability as compared with this, it is possible to set strict processing conditions for providing functions completely and to provide many functions to a polarizing film advantageously.

When the polycarbonate resin film of the present invention is used as a light transmitting layer for optical discs, it is stacked on the surface of an information recording layer before use.

To improve adhesion between the information recording layer and the film of the present invention, a corona treatment and anchor coating may be carried out on the surface of the film of the present invention to raise the surface energy of the film, before it is stacked on the information recording layer. To prevent the surface from being damaged or scratched by the handling of an optical disc, a surface hardening treatment (hard coating) is preferably carried out on at least one side of the polycarbonate resin film of the present invention.

When the polycarbonate resin film of the present invention is used as a light transmitting layer for optical discs, a highly reliable optical disc having little noise and stable signal characteristics is obtained.

When the polycarbonate resin film of the present invention is used as a light transmitting layer for optical discs, its thickness is preferably 20 to 100 μm, more preferably 40 to 100 μm, much more preferably 50 to 95 μm. The required thickness of the light transmitting layer for optical discs differs according to the structure and layer constitution of an optical disc comprising the polycarbonate resin film of the present invention and the types and thicknesses of an adhesive layer and a hard coat layer. For example, optical discs commercially available under the trade name of "Blu-ray disc" include read-only discs (BD-ROM), write once read-many discs (BD-R) and rewritable discs (BD-RE) all of which have a single-layer structure or a dual layer structure. Out of these, a film having a thickness of about 92 μm is required as a light transmitting layer for BD-ROM having a single-layer structure and a film having a thickness of about 50 to 70 μm is required as a light transmitting layer for BD-ROM having a dual layer structure. A film having a thickness of about 75 to 80 μm is required as a light transmitting layer for BD-RE having a single-layer structure and a film having a thickness of about 50 to 70 μm is required as a light transmitting layer for BD-RE having a dual layer structure.

According to the process of manufacturing the polycarbonate resin film of the present invention, a polycarbonate resin film which has low retardations in the in-plane direction and the thickness direction of the film and small thickness nonuniformity when it has a thickness optionally selected from the above wide range can be manufactured efficiently at a low cost by suitably controlling film forming conditions.

EXAMPLES

The following examples are provided for the purpose of further illustrating the present invention but are in no way to be taken as limiting. In Examples and Comparative Examples, physical properties were measured by the following methods.

(1) Viscosity Average Molecular Weight of Polycarbonate

The viscosity average molecular weight M of the polycarbonate was calculated from the specific viscosity ($\eta_{sp}$) of a methylene chloride solution having a concentration of 0.7 g/dL at 20° C. based on the following equation.

$$\eta_{sp}/c = [\eta] + 0.45 \times [\eta]^2 c$$

$$[\eta] = 1.23 \times 10^{-4} M^{0.83}$$

(in the above equations, $[\eta]$ is an intrinsic viscosity, and "c" is the concentration of the polycarbonate solution (c=0.7 g/dL).

(2) Thickness and Thickness Nonuniformity of Film

Four samples were cut out from the film wound up, and the protective film was removed from the samples to measure the thickness of each sample at intervals of 0.45 mm in the longitudinal direction continuously with the Film Thickness Tester KG601 contact type thickness meter of Anritsu Corporation. The average value of the obtained measurement data was taken as the average thickness, the thickness nonuniformity was calculated from the following equation, and the average thickness and thickness nonuniformity of a sample having the largest thickness nonuniformity out of the four samples were taken as the thickness and thickness nonuniformity of the film.

Thickness nonuniformity (%)={(maximum thickness−minimum thickness)/average thickness}×100

In Examples and Comparative Examples, the four samples were cut out and measured as follows.

Examples 1 to 4 and Comparative Examples 1 and 5 and 6

At 3 points which were the center point in the width direction of the film wound up and 2 points 500 mm away from the center point toward the both ends in the width direction, 3 rectangular samples having a length of 800 mm in the winding direction (length direction) and a width of 50 mm in the width direction of the film (the above three points were the center points in the width direction of the samples) and 1 rectangular sample having a length of 1,100 mm (i.e. total width) in the width direction of the film and a width of 50 mm in the winding direction of the film were cut out and measured.

Examples 5 to 8 and Comparative Examples 2 to 4

At 3 points which were the center point in the width direction of the film wound up and 2 points 400 mm away from the center point toward the both ends in the width direction, 3 rectangular samples having a length of 900 mm in the winding direction (length direction) and a width of 50 mm in the width direction of the film (the above 3 points were the center points in the width direction of the samples) and 1 rectangular sample having a length of 900 mm (i.e. total width) in the width direction of the film and a width of 50 mm in the winding direction of the film were cut out and measured.

(3) Total Light Transmittance and Haze of Film

The total light transmittance and haze of the film were measured with the COH-300A color difference and turbidity meter of Nippon Denshoku Industries Co., Ltd. The total light transmittances and hazes of the films of Examples 1 to 4 and Comparative Examples 1, 5 and 6 were measured at 3 points which were the center point in the width direction of the film wound up and the points 500 mm away from the center point toward the both ends in the width direction, those of the films of Examples 5 to 8 and Comparative Examples 2 to 4 were measured at 3 points which were the center point in the width direction of the film wound up and the points 400 mm away from the center point toward the both ends in the width direction after the protective film was removed from these films, and the average values were taken as the total light transmittances and hazes of the films.

(4) Retardation in the Plane of the Film (R) and Retardation in Thickness Direction (Rth)

These were measured at a wavelength of 589 nm and a low retardation in a 3-D refractive index measurement mode with the KOBRA-21ADH retardation meter of Oji Scientific Instruments.

The film from which the protective film was removed was spun on the slow axis of the film to measure its retardation by changing the incident angle, and the refractive indices nx, ny and nz were calculated from the retardation value at each incident angle and the film thickness "d" to calculate R(589) and Rth(589) from the following equations.

$$R=(n_x-n_y)\times d$$

$$Rth=\{(n_x+n_y)/2-n_z\}\times d$$

(wherein $n_x$ is a refractive index in the direction of the slow axis in the plane of the film, $n_y$ is a refractive index in the direction of the fast axis perpendicular to $n_x$ in the plane of the film, and $n_z$ is a refractive index in the thickness direction.)

The measurement was made at a total of 24 points which were 8 points consisting of 2 points 50 mm away from the center portion in the width direction of the film toward the both ends and 3 points away from each of these points at intervals of 100 mm in the width direction (toward the both ends), and 2 points from each of the 8 points at intervals of 500 mm in the winding direction of the film to obtain the average value, the largest value and the smallest value of these measurement data.

(5) Heat Shrinkage Factor of Film

Nine points on the film were determined at random, strip-like samples having a width of 10 mm in the width direction and a length of 150 mm in the winding direction were cut out with these points as the centers thereof, and the protective film was removed from each of the samples.

After gauge marks were made on these 9 film samples at intervals of about 100 mm at a constant temperature of 23° C. and a constant humidity of 55% RH and the intervals were accurately measured by using a laser microscope, the film samples were heated at 140° C. in a thermostat bath for 1 hour. After they were taken out and cooled to room temperature, the above intervals between the gauge marks were measured by using the laser microscope at a constant temperature of 23° C. and a constant humidity of 55% RH to calculate the heat shrinkage factor of the film from the following equation, and the average value of 9 measurement data was taken as the heat shrinkage factor of the film.

Heat shrinkage factor (%)=[{(interval before heat treatment)−(interval after heat treatment)}/(interval before heat treatment)]×100

Example 1

A pellet of an optical-grade polycarbonate resin (AD-5503 of Teijin Chemicals Ltd., homopolymer of bisphenol A, Tg=145° C., viscosity average molecular weight M=15,000) was dried in a vacuum dry type tray drier at 120° C. for 4 hours and injected into the heating hopper of a melt extruder heated at 110° C. The cylinder temperature of the extruder was set to 290° C., and an SUS nonwoven fabric disc-like filter having an average opening of 10 μm was used as a filter element between the extruder and the T-die. The molten resin was extruded onto the surface of a rotating chill roll by the T-die by which the temperature of the molten resin right after delivery was set to 290° C. The lip width of the T-die was set to 1,400 mm and the opening of the lip was set to 2 mm. The die lip had a flat under surface without irregularities. The melt viscosity of the molten resin at 290° C. was 140 Pa·s.

There were 3 chill rolls as shown in FIG. 1, and they had a diameter of 360 mm, a roll width of 1,800 mm and a structure that the surface temperatures of the rolls were controlled to become uniform by circulating a refrigerant. The air gap "a" between the end of the lip of the T-die and the surface of the chill roll was set to 15 mm, and the dropping position of the molten resin on the first chill roll was set to ensure that the angle "b" formed by a straight line connecting the dropping point of the molten resin and the center of the first chill roll and a plumb line was 10°.

The temperature of the first chill roll was set to 140° C., the temperature of the second chill roll was set to 135° C., and the temperature of the third chill roll was set to 130° C., the circumferencial velocity of the first chill roll was set to 10 m/sec. As for the ratio of the circumferential velocity $R_1$ of the first chill roll, the circumferential velocity $R_2$ of the second chill roll and the circumferential velocity $R_3$ of the third chill roll, the $R_2/R_1$ ratio was set to 1.008, and the $R_3/R_2$ ratio was set to 1.000. The distance between the first chill roll and the second chill roll was set to 5 mm, and the distance between the second chill roll and the third chill roll was set to 5 mm.

The molten resin delivered into a film form from the T-die was circumscribed around the first chill roll, the second chill roll and the third chill roll sequentially, and the film was taken off by a take-off roll with a tension corresponding to a film load per sectional area of 1.5 N/mm² after it was separated from the third chill roll. 100 mm both end portions were cut off, and a film having a width of 1,100 mm, a thickness of about 80 µm and a length of 500 m was rolled together with a protective film prepared by making the surface of a biaxially stretched heat set polyethylene terephthalate film having a thickness of 29 µm slightly sticky to obtain a roll.

The characteristic properties of the obtained film are shown in Table 1. The obtained polycarbonate resin film had extremely high uniformity in appearance as a die streak and foreign matter were rarely seen, extremely small thickness nonuniformity, a low in-plane retardation and a low retardation in the thickness direction.

Example 2

A film having a thickness of about 40 µm was obtained under the same conditions as in Example 1 except that the circumferential velocity $R_1$ of the first chill roll was set to 20 m/min and the circumferential velocities of the second chill roll and the third chill roll were changed to ensure that the $R_2/R_1$ and $R_3/R_2$ ratios became the same as in Example 1. The characteristic properties of the obtained polycarbonate resin film are shown in Table 1. The film had extremely high uniformity in appearance as a die streak and foreign matter were rarely seen, extremely small thickness nonuniformity, a low in-plane retardation and a low retardation in the thickness direction.

Example 3

A film having a thickness of about 80 µm was obtained in the same manner as in Example 1 except that the both end portions of the film were brought into close contact with the first chill roll by static electricity, the air gap "a" was set to 15 mm, the angle "b" formed by the straight line connecting the dropping point of the molten resin and the center of the first chill roll and the plumb line was set to 20°, the circumferential velocity $R_1$ of the first chill roll was set to 10 m/min, the $R_2/R_1$ ratio was set to 1.010 and the $R_3/R_2$ ratio was set to 1.000. An SUS piano wire having a thickness of about 180 µm which was polished clean was used for electrostatic contact and sheathed with a plastic thin tube except for portions corresponding to 30 mm both end portions of the film.

The characteristic properties of the obtained polycarbonate resin film are shown in Table 1. The film had extremely high uniformity in appearance as a die streak and foreign matter were rarely seen, extremely small thickness nonuniformity, a low in-plane retardation and a low retardation in the thickness direction.

Example 4

A film having a thickness of about 80 µm was obtained from a pellet of a polycarbonate resin (homopolymer of bisphenol A, Tg=148° C., viscosity average molecular weight M=17,000) in the same manner as in Example 1 except that the air gap "a" was set to 20 mm, the angle "b" formed by the straight line connecting the dropping point of the molten resin and the center of the first chill roll and the plumb line was set to 10°, the temperature of the first chill roll was set to 142° C., the temperature of the second chill roll was set to 138° C., the temperature of the third chill roll was set to 135° C., the circumferential velocity $R_1$ of the first chill roll was set to 10 m/min, the $R_2/R_1$ ratio was set to 1.010 and the $R_3/R_2$ ratio was set to 1.000.

The characteristic properties of the obtained polycarbonate resin film are shown in Table 1. The film had extremely high uniformity in appearance as a die streak and foreign matter were rarely seen, extremely small thickness nonuniformity, a low in-plane retardation and a low retardation in the thickness direction.

Example 5

A pellet of an optical-grade polycarbonate resin (AD-5503 of Teijin Chemicals Ltd., homopolymer of bisphenol A, Tg=145° C., viscosity average molecular weight M=15,000) was dried in a dehumidification drier at 120° C. for 4 hours and injected into the heating hopper of a melt extruder heated at 90° C. The cylinder temperature of the extruder was set to 270° C., and an SUS nonwoven fabric disc-like filter having an average opening of 10 µm was used as a filter element between the extruder and the T-die. The molten resin was extruded onto the surface of a rotating chill roll by the T-die by which the temperature of the molten resin right after delivery was set to 270° C. The lip width of the T-die was set to 1,800 mm, and the opening of the lip was set to 2 mm. The die lip had a flat under surface without irregularities.

There were 3 chill rolls as shown in FIG. 1, and they had a diameter of 360 mm, a roll width of 1,800 mm and a structure that the surface temperatures of the rolls were controlled to become uniform by circulating a refrigerant. The air gap "a" between the end of the lip of the T-die and the surface of the chill roll was set to 15 mm, and the dropping position of the molten resin on the first chill roll was set to ensure that the angle "b" formed by the straight line connecting the dropping point of the molten resin and the center of the first chill roll and the plumb line was 10°.

The temperature of the first chill roll was set to 143° C., the temperature of the second chill roll was set to 140° C., the temperature of the third chill roll was set to 140° C., the circumferential velocity $R_1$ of the first chill roll was set to 7.2 m/min. As for the ratios of the circumferential velocity $R_1$ of the first chill roll, the circumferential velocity $R_2$ of the second chill roll and the circumferential velocity $R_3$ of the third chill roll, the $R_2/R_1$ ratio was set to 1.030, and the $R_3/R_2$ ratio was set to 1.0015. The distance between the first chill roll and the second chill roll was set to 3 mm, and the distance between the second chill roll and the third chill roll was set to 3 mm.

The molten resin extruded into a film form from the T-die was circumscribed around the first chill roll, the second chill roll and the third chill roll sequentially, and the film was taken off by the take-off roll with a tension corresponding to a film load per sectional area of 1.5 N/mm² after it was separated from the third chill roll. 400 mm both end portions were cut off, and a film having a width of 900 mm, a thickness of about 92 μm and a length of 1,000 m was rolled together with a polyethylene-based protective film having a thickness of 30 μm and an adhesive layer to obtain a roll.

The characteristic properties of the obtained film are shown in Table 1. The obtained polycarbonate resin film had extremely high uniformity in appearance as a die streak and foreign matter were rarely seen, extremely small thickness nonuniformity, a low in-plane retardation and a low retardation in the thickness direction.

Example 6

A film having a thickness of about 78 μm was obtained under the same conditions as in Example 5 except that the circumferential velocity $R_1$ of the first chill roll was set to 8.5 m/min, and the circumferential velocities of the second chill roll and the third chill roll were changed to ensure that the $R_2/R_1$ and $R_3/R_2$ ratios became the same as in Example 5. The characteristic properties of the obtained polycarbonate resin film are shown in Table 1. The film had extremely high uniformity in appearance as a die streak and foreign matter were rarely seen, extremely small thickness nonuniformity, a low in-plane retardation and a low retardation in the thickness direction.

Example 7

A film having a thickness of about 67 μm was obtained under the same conditions as in Example 5 except that the circumferential velocity $R_1$ of the first chill roll was set to 9.9 m/min, and the circumferential velocities of the second chill roll and the third chill roll were changed to ensure that the $R_2/R_1$ and $R_3/R_2$ ratios became the same as in Example 5. The characteristic properties of the obtained polycarbonate resin film are shown in Table 1. The film had extremely high uniformity in appearance as a die streak and foreign matter were rarely seen, extremely small thickness nonuniformity, a low in-plane retardation and a low retardation in the thickness direction.

Example 8

A film having a thickness of about 92 μm was obtained from a pellet of a polycarbonate resin (homopolymer of bisphenol A, Tg=148° C., viscosity average molecular weight M=18,000) under the same conditions as in Example 5 except that the temperature of the first chill roll was set to 145° C., the temperature of the second chill roll was set to 142° C., the temperature of the third chill roll was set to 142° C., the circumferential velocity $R_1$ of the first chill roll was kept at 7.2 m/min, the $R_2/R_1$ ratio was set to 1.035 and the $R_3/R_2$ ratio was set to 1.002. The characteristic properties of the obtained polycarbonate resin film are shown in Table 1. The film had extremely high uniformity in appearance as a die streak and foreign matter were rarely seen, extremely small thickness nonuniformity, a low in-plane retardation and a low retardation in the thickness direction.

Comparative Example 1

A film having a thickness of about 80 μm was obtained in the same manner as in Example 1 except that the air gap "a" was set to 100 mm while the angle "b" formed by the straight line connecting the dropping point of the molten resin and the center of the first chill roll and the plumb line was kept at 10°. The characteristic properties of the obtained film are shown in Table 1. The obtained polycarbonate resin film had high optical isotropy with a low in-plane retardation and a low retardation in the thickness direction but its thickness nonuniformity was large.

Comparative Example 2

A polycarbonate resin film having a thickness of about 92 μm was obtained under the same conditions as in Example 5 except that the circumferential velocity $R_1$ of the first chill roll was set to 7.56 m/min, the $R_2/R_1$ ratio was set to 1.001 and the $R_3/R_2$ ratio was set to 0.995. The characteristic properties of the obtained film are shown in Table 1. Although the thickness nonuniformity of the film was small, the in-plane retardation was high.

Comparative Example 3

A polycarbonate resin film having a thickness of about 92 μm was obtained in the same manner as in Example 5 except that the temperature of the first cooing roll was set to 140° C., the temperature of the second chill roll was set to 132° C., the temperature of the third chill roll was set to 125° C., the circumferential velocity $R_1$ of the first chill roll was set to 7.27 m/min, the $R_2/R_1$ ratio was set to 1.020 and the $R_3/R_2$ ratio was set to 1.001. The characteristic properties of the obtained film are shown in Table 1. Although the thickness nonuniformity of the film was small, the in-plane retardation was high.

Comparative Example 4

A polycarbonate resin film having a thickness of about 92 μm was obtained in the same manner as in Example 5 except that the film was taken off by a take-off roll with a tension corresponding to a film load per sectional area of 0.4 N/mm² after it was separated from the third chill roll. The characteristic properties of the obtained polycarbonate resin film are shown in Table 1. Although the thickness nonuniformity of the film was small, the in-plane retardation was high.

Comparative Example 5

Film formation was carried out by using an apparatus having only one chill roll and not three chill rolls. This chill roll had a diameter of 800 mm, a roll width of 1,800 mm and a structure that the surface temperature of the roll could be controlled to become uniform by circulating a refrigerant and the speed could be controlled at an accuracy of 0.01%. The temperature of the roll was set to 138° C., the air gap was set to 20 mm, the angle formed by the straight line connecting the dropping point of the molten resin on the chill roll and the center of the chill roll and the plumb line was set to 10°, and the circumferential velocity of the chill roll was set to 10 m/min. Other conditions were set the same as in Example 1 to obtain a roll of a laminate consisting of a polycarbonate resin film and a polyethylene protective film and having a width of 1,100 mm and a thickness of about 80 μm. The characteristic properties of the film are shown in Table 1. Although the obtained polycarbonate resin film had high optical isotropy with a low in-plane retardation and a low retardation in the thickness direction, its thickness nonuniformity was large.

Comparative Example 6

A pellet of a high viscosity-grade polycarbonate resin (C-1400QJ of Teijin Chemicals Ltd., homopolymer of bisphenol A, viscosity average molecular weigh M=38,000) was dissolved in methylene chloride to prepare a 18 wt % solution. This solution was let pass through a filter having an average opening diameter of 3 μm to remove foreign matter therefrom, introduced into a T-die having a width of 1,500 mm and then cast over an SUS belt substrate which was mirror polished as an about 480 μm thick liquid film. Then, hot air having a temperature of 30° C. was applied to this, the temperature of the hot air was gradually raised from 30° C. to 55° C. to remove the solvent until the content of the residual solvent in the polycarbonate resin film became 18 wt %, and then the film was separated from the substrate. The separated polycarbonate resin film was fed to a pin tenter type drier and carried while the solvent was removed.

The width of a rail was reduced in accordance with the shrinkage of the film by the evaporation of the solvent in the pin tenter, and the solvent was removed by gradually increasing the temperature from 90° C. to 135° C. while the orientation of the molecules of the polycarbonate was prevented as much as possible. Subsequently, the film was let pass through a roll suspension type drier having a hot air temperature of 135° C. in the first half and 140° C. in the latter half and taken off. Thereafter, 70 mm both end portions were cut off to obtain a film having a width of 1,300 mm and a length of 500 m which was then rolled together with a protect film prepared by making the surface of a biaxially oriented heat set polyethylene terephthalate film having a thickness of 29 μm sticky to obtain a roll.

The characteristic properties of the obtained film are shown in Table 1. The heat shrinkage factor of this film was lower than that of the molten and extruded film. Although the film had small thickness nonuniformity and low retardation, it had high retardation in the thickness direction and highly in-plane orientation.

TABLE 1

| | | Example 1 | Example 2 | Example 3 | Example 4 | Example 5 |
|---|---|---|---|---|---|---|
| Average thickness (μm) | | 80.2 | 40.1 | 79.6 | 80.4 | 92.0 |
| Thickness nonuniformity (%) | | 0.8 | 1.2 | 0.6 | 1.0 | 0.6 |
| R(589) | Average value (nm) | 5.2 | 3.2 | 6.1 | 9.2 | 7.1 |
| | Highest value (nm) | 5.7 | 3.8 | 6.8 | 9.5 | 8.7 |
| | Lowest value (nm) | 4.8 | 2.2 | 5.1 | 7.3 | 5.8 |
| Rth(589) | Average value (nm) | 8.1 | 6.9 | 12.7 | 14.4 | 21.6 |
| | Highest value (nm) | 8.8 | 7.5 | 13.9 | 15.2 | 23.7 |
| | Lowest value (nm) | 7.6 | 5.5 | 11.4 | 13.5 | 18.5 |
| Heat shrinkage factor | Width direction (%) | 0.19 | 0.20 | 0.21 | 0.17 | 0.18 |
| | Winding direction (%) | 0.07 | 0.08 | 0.08 | 0.05 | 0.05 |
| Total light transmittance (%) | | 90.8 | 90.9 | 90.7 | 90.8 | 90.9 |
| Haze (%) | | 0.1 | 0.2 | 0.1 | 0.1 | 0.2 |

| | | Example 6 | Example 7 | Example 8 | Comparative Example 1 | Comparative Example 2 |
|---|---|---|---|---|---|---|
| Average thickness (μm) | | 78.0 | 67.1 | 92.0 | 80.0 | 92.0 |
| Thickness nonuniformity (%) | | 0.5 | 0.4 | 0.6 | 3.6 | 0.6 |
| R(589) | Average value (nm) | 6.2 | 5.2 | 7.3 | 4.6 | 14.2 |
| | Highest value (nm) | 7.5 | 6.2 | 8.8 | 6.8 | 16.7 |
| | Lowest value (nm) | 5.3 | 4.5 | 6.0 | 1.5 | 12.5 |
| Rth(589) | Average value (nm) | 20.3 | 16.3 | 22.1 | 11.4 | 23.5 |
| | Highest value (nm) | 21.4 | 18.4 | 23.5 | 15.1 | 25.8 |
| | Lowest value (nm) | 17.4 | 15.1 | 19.6 | 9.2 | 21.2 |
| Heat shrinkage factor | Width direction (%) | 0.16 | 0.13 | 0.23 | 0.17 | 0.13 |
| | Winding direction (%) | 0.04 | 0.03 | 0.07 | 0.08 | 0.04 |
| Total light transmittance (%) | | 90.8 | 90.6 | 90.6 | 90.9 | 90.7 |
| Haze (%) | | 0.2 | 0.1 | 0.3 | 0.1 | 0.1 |

| | | Comparative Example 3 | Comparative Example 4 | Comparative Example 5 | Comparative Example 6 |
|---|---|---|---|---|---|
| Average thickness (μm) | | 92.0 | 92.0 | 80.4 | 80.1 |
| Thickness nonuniformity (%) | | 0.8 | 0.5 | 4.6 | 1.6 |
| R(589) | Average value (nm) | 18.6 | 15.1 | 5.0 | 4.2 |
| | Highest value (nm) | 21.3 | 17.5 | 6.5 | 3.8 |
| | Lowest value (nm) | 17.4 | 13.8 | 2.1 | 4.4 |
| Rth(589) | Average value (nm) | 30.4 | 20.6 | 8.2 | 85.2 |
| | Highest value (nm) | 32.9 | 22.6 | 10.2 | 83.4 |
| | Lowest value (nm) | 29.7 | 18.3 | 6.8 | 87.1 |
| Heat shrinkage factor | Width direction (%) | 0.15 | 0.15 | 0.07 | 0.01 |
| | Winding direction (%) | 0.05 | 0.05 | 0.04 | 0.01 |
| Total light transmittance (%) | | 90.5 | 90.8 | 90.7 | 90.8 |
| Haze (%) | | 0.3 | 0.2 | 0.2 | 0.2 |

Example 9

The VF9P-75R polyvinyl alcohol film (of Kuraray Co., Ltd.) was stretched to 3.3 times in the longitudinal direction at 105° C. This stretched film was immersed in an aqueous solution containing 0.2 wt % of iodine and 10 wt % of potassium iodide at 30° C. for 1 minute to adsorb iodine. Further, the film was immersed in an aqueous solution containing 12 wt % of boric acid and 10 wt % of potassium iodide at 60° C. for 4 minutes to fix iodine and stretched to 1.3 times in the longitudinal direction at 60° C. Thereafter, the film was rinsed in water and dried to obtain a polyvinyl alcohol-iodine-based polarizing film.

Meanwhile, an acrylic resin-based primer (PC-7A of Shin-Etsu Chemical Co., Ltd.) as an anchor coat layer was diluted with methyl isobutyl ketone to 2 times and applied to the polycarbonate resin film (from which the protective film was removed) obtained in Example 1 to form a 1 μm-thick adhesive layer on one side of the film, and a pressure-sensitive adhesive layer having a thickness of 20 μm obtained by casting a solution consisting of 35 parts by weight of a butyl acrylate/2-ethylhexyl acrylate/acrylic acid copolymer (copolymerization ratio=30/67/3 (molar ratio)), 2 parts by weight of a tolylene isocyanate-trimethylpropane adduct and 63 parts by weight of ethyl acetate over a release sheet and heating it at 80° C. for 3 minutes was transferred to this film to obtain the polycarbonate resin film having the pressure-sensitive adhesive layer.

A polarizing plate was obtained by laminating this polycarbonate resin film having the pressure-sensitive adhesive layer on both sides of the above polarizing film as a protective film. This polarizing plate had a transmittance of 42% and a polarization degree of 99.1%.

The polarization degree was calculated based on the following equation from $Y_0$ and $Y_{90}$ measured by the integral sphere of a spectrophotometer when $Y_0$ represents a transmittance (parallel transmittance) when two polarizing plates were placed one upon the other in such a manner that their polarization axes were parallel to each other and $Y_{90}$ represents a transmittance (orthogonal transmittance) when the two polarizing plates were placed one upon the other in such a manner that their polarization axes were orthogonal to each other.

$$\text{Polarization degree } P=\{(Y_0-Y_{90})/(Y_0+Y_{90})\}^{1/2}$$

A high-temperature test and a high-temperature high-humidity test were made on the polarizing plate to check its durability by the method of this Example. In the high-temperature test, after the polarizing plate obtained in this Example was heated by a high-temperature drier set at 80° C. for 500 hours, changes in the characteristic properties of the polarizing plate were investigated. No big change was seen in the appearance of the polarizing plate, and the retentions of transmittance and polarization degree were 95% or more of the initial values. In the high-temperature high-humidity test, after a polarizing plate manufactured in the same manner as above was put in a high-temperature high-humidity tester set at 60° C. and 80% RH for 500 hours, changes in the characteristic properties of the polarizing plate were investigated. No big change was seen in the appearance of the polarizing plate and the retentions of transmittance and polarization degree were 95% or more of the initial values.

Comparative Example 7

A polarizing plate was obtained in the same manner as in Example 9 except that a TAC film having a thickness of 80 μm (Fujitac of Fuji Photo Film Co., Ltd.) was used as a protective film for the polarizing plate and a polyvinyl alcohol-based adhesive was used to laminate it with a polarizing film. The obtained polarizing plate had a transmittance of 43% and a polarization degree of 99.3%. A durability test was made on this polarizing plate in the same manner as in Example 5. In the high-temperature test, the withdrawal of the TAC film from the end portions of the polarizing plate was seen due to the shrinkage of the TAC film. In the high-temperature high-humidity test, it was found that the TAC film was unsatisfactory in terms of durability as whitening which seemed to be caused by the hydrolysis of the TAC film was seen.

Example 10

Light leakage which becomes a problem when the polycarbonate resin film is used as a protective film for polarizing films was evaluated as follows.

Two polyvinyl alcohol-iodine-based polarizing films were formed in the same manner as in Example 9 and arranged in a cross nicol's state in which the absorption axes of these mutually cross orthogonally, and the polycarbonate resin film (from which the protective film was removed) obtained in Example 1 was sandwiched between the polarizing films to manufacture a laminate film consisting of the polarizing film, the polycarbonate resin film and the polarizing film and measuring 20 cm×20 cm.

This laminated film was checked for light leakage from a black state. That is, the transmission of light from a backlight was observed with the eyes by changing the angle between the direction of the polycarbonate resin film and the absorption axes of the polarizing films. As a result, almost no light leakage was seen.

Examples 11 to 13 and Comparative Examples 8 and 9

Laminated films, each consisting of a polarizing film, a polycarbonate resin film and a polarizing film manufactured in the same manner as in Example 10 except that the polycarbonate resin films manufactured in Examples 2 to 4 and Comparative Examples 1 and 5 were used as the polycarbonate resin film, were evaluated for light leakage. The results are shown in Table 2.

TABLE 2

| | Type of polycarbonate | Light leakage |
|---|---|---|
| Example 10 | Example 1 | Almost none |
| Example 11 | Example 2 | Almost none |
| Example 12 | Example 3 | Almost none |
| Example 13 | Example 4 | Almost none |
| Comparative Example 8 | Comparative Example 1 | Slight light leakage |
| Comparative Example 9 | Comparative Example 5 | Slight light leakage |

Example 14

A commercially available IPS-mode 32-inch liquid crystal TV was disassembled, and polarizing plates on both sides of a display panel were removed carefully to take out an IPS liquid crystal cell. Polarizing plates having a polycarbonate resin film manufactured in the same manner as in Example 9 as a protective film were laminated on both sides of a 20 cm×20 cm portion of this liquid crystal cell in a cross nicol state. A polyvinyl alcohol-based aqueous solution was used to laminate them. The absorption axes of the polarizing plates were aligned with those of the commercially available polarizing plates which were removed.

When a color shift from a slant 45° direction was observed in this state, it was rarely seen.

Comparative Example 10

When a polarizing plate was laminated on both side of an IPS liquid crystal in the same manner as in Example 14 except that the polarizing plate was manufactured in the same manner as in Example 9 by using the polycarbonate resin film manufactured by the solvent cast method in Comparative Example 6 as a protective film and a color shift was observed from a slant 45° direction, yellowing was seen.

Comparative Example 11

When a polarizing plate was laminated on both side of an IPS liquid crystal in the same manner as in Example 14 except that a polarizing plate having a TAC film as a protective film manufactured in the same manner as in Comparative Example 7 was used and a color shift was observed from a slant 45° direction, yellowing was seen.

Example 15

An optical disc (Blu-ray Disc (trade name) type) having the film formed in Example 5 as a light transmitting layer was prepared.

First, a pellet of a polycarbonate resin (AD-5503 of Teijin Chemicals Ltd., homopolymer of bisphenol A, Tg=145° C., viscosity average molecular weight M=15,000) was injection molded by an injection molding machine for optical discs (M35B-D-DM of Meiki Co., Ltd.) to form a substrate for an information recording layer having an outer diameter of 120 mm, an inner diameter of 15 mm and a thickness of 1.1 mm. For this injection molding, a stamper for Blue-ray Disc ROM was set in a metal mold to mold the pellet so as to form pits having recording data information and tracking servo signals on one side of the substrate.

Then, the formed substrate was fixed in the vacuum layer of a high-frequency magnetron sputtering device, the inside of the device was evacuated to $5.3 \times 10^{-5}$ Pa, an Ar gas was introduced to adjust the gas flow rate so as to obtain a pressure of 0.067 Pa, and an Ag film was deposited to a thickness of 25 nm by DC sputtering on the pit side of the substrate by using an Ag target at a discharge electric power of 500 Ws.

An ultraviolet curable phenol novolak epoxy acrylate resin was applied to the Ag film side of the substrate having the above Ag film by spin coating.

The polycarbonate resin film manufactured in Example 5 was cut to an outer diameter of 120 mm and an inner diameter of 15 mm, the protective film was removed from the film, the resulting polycarbonate resin film was laminated on the phenol novolak epoxy acrylate resin layer formed on the substrate, and the resulting laminate was let pass through an ultraviolet exposure machine to be cured. Further, an acrylate-based hard coating was applied to the laminated polycarbonate resin film by spin coating and cured by ultraviolet light so as to obtain an optical disc (Blu-ray Disc medium) having the polycarbonate resin film as a light transmitting layer.

The optical disc obtained as described above had a small focus residual error, a stable reproduction signal level and a small jitter which is a shift in the time axis direction of the signal.

Comparative Example 12

An optical disc (Blu-ray Disc medium) was obtained in the same manner as in Example 15 except that the polycarbonate resin film having a high in-plane retardation obtained in Comparative Example 2 was used as a light transmitting layer.

The obtained optical disc had an unstable reproduction signal level and large noise.

Comparative Example 13

An optical disc (Blu-ray Disc medium) was obtained in the same manner as in Example 15 except that the polycarbonate resin film having large thickness nonuniformity obtained in Comparative Example 5 was used as a light transmitting layer.

The obtained optical disc had a large focus residual error and a large jitter.

The invention claimed is:

1. A polycarbonate resin film,
wherein:
the polycarbonate resin film is a homopolymer of bisphenol A and has an average thickness of 10 to 150 a thickness nonuniformity of 2% or less, a retardation R(589) in the plane of the film measured at a wavelength of 589 nm of 12 nm or less, a retardation Rth(589) in the thickness direction of the film measured at a wavelength of 589 nm of 35 nm or less and is used for optical purposes; and
the polycarbonate resin film is produced by a melt extrusion method in which a molten polycarbonate resin extruded into a film form from a die is circumscribed around a first chill roll, a second chill roll and a third chill roll sequentially to be cooled and then taken off,
wherein:
an air gap between the die and the first chill roll is 5 to 70 mm,
a circumferential velocity $R_1$ of the first chill roll, a circumferential velocity $R_2$ of the second chill roll and a circumferential velocity $R_3$ of the third chill roll satisfy $R_2/R_1=1.002$ to 1.050 and $R_3/R_2=1.000$ to 1.010,
the temperatures of the three chill rolls are Tg to (Tg−15° C.), where Tg is the glass transition temperature of the polycarbonate resin,
the film is taken off with a tension corresponding to a load applied to the film of 0.5 to 3.0 N/mm² after it is separated from the chill roll, and
the space between the first chill roll and the second chill roll and the space between the second chill roll and the third chill roll are 5 t to 100 t, where t is the thickness of the film to be produced.

2. The polycarbonate resin film according to claim 1 which has a heat shrinkage factor of 0.02 to 0.3% after it is heated at 140° C. for 1 hour.

3. The polycarbonate resin film according to claim 1 which is used as a protective film for a polarizing film of liquid crystal display devices.

4. The polycarbonate resin film according to claim 1 which is used as a light transmitting layer for optical discs.

5. A process for manufacturing the polycarbonate resin film of claim 1 by a melt extrusion method in which a molten polycarbonate resin extruded into a film form from a die is circumscribed around a first chill roll, a second chill roll and a third chill roll sequentially to be cooled and then taken off, wherein
the air gap between the die and the first chill roll is 5 to 70 mm, the circumferential velocity $R_1$ of the first chill roll, the circumferential velocity $R_2$ of the second chill roll and the circumferential velocity $R_3$ of the third chill roll satisfy $R_2/R_1=1.002$ to 1.050 and $R_3/R_2=1.000$ to 1.010, the temperatures of the three chill rolls are Tg to (Tg−15° C.) (Tg is the glass transition temperature of the polycarbonate resin in use), and the film is taken off with a tension corresponding to a load applied to the film of 0.5 to 3.0 N/mm² after it is separated from the chill roll.

6. A roll of the polycarbonate resin film obtained by rolling the film of claim 1.

* * * * *